Sept. 15, 1925.
J. D. LYON
1,553,451
METHOD AND APPARATUS FOR MARKING SPHERICAL AND SPHEROIDAL SURFACES
Filed Oct. 6, 1922
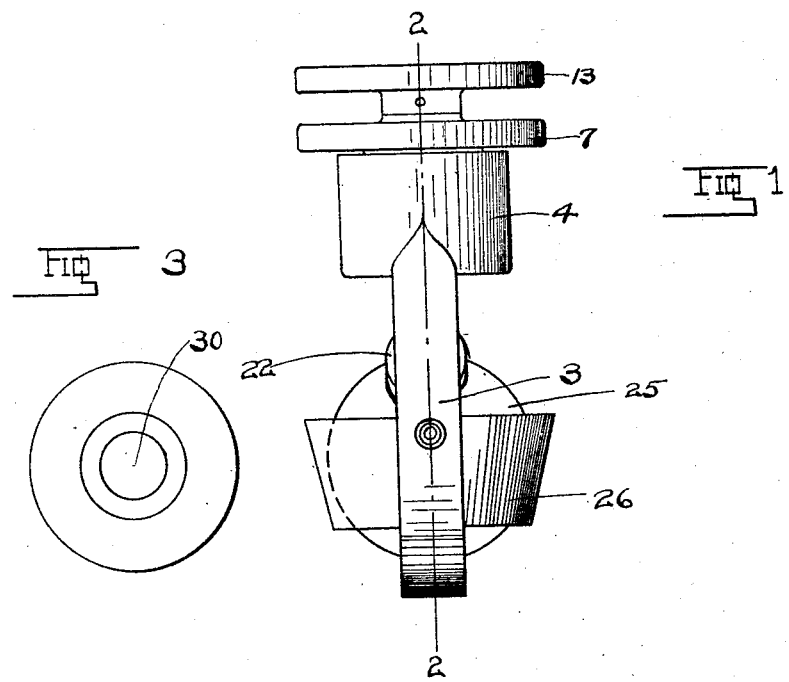
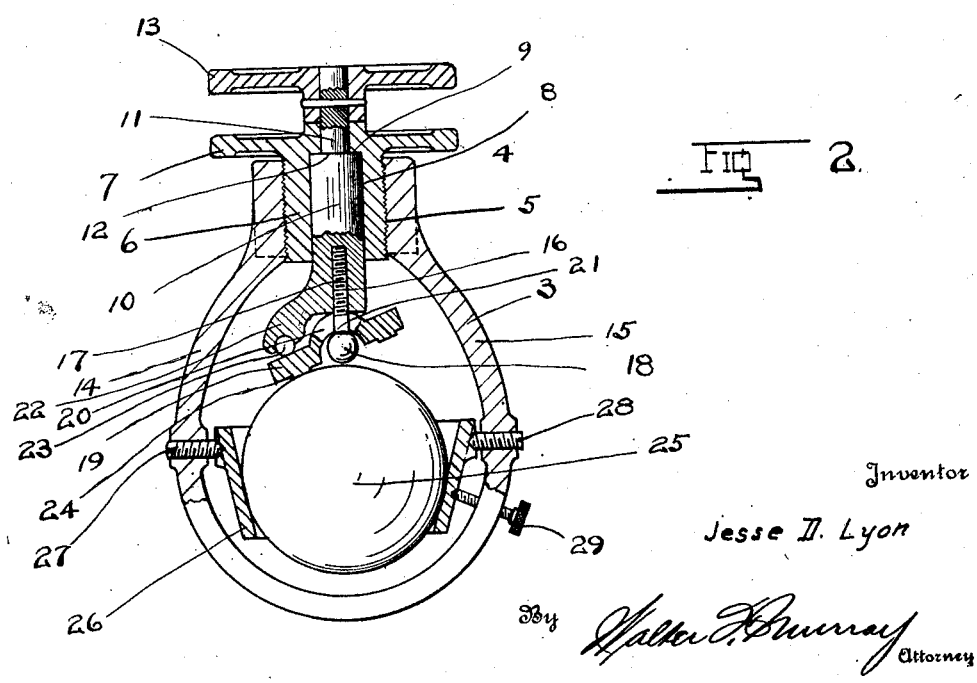
Inventor
Jesse D. Lyon Patented Sept. 15, 1925.

1,553,451

UNITED STATES PATENT OFFICE.

JESSE D. LYON, OF CINCINNATI, OHIO.

METHOD AND APPARATUS FOR MARKING SPHERICAL AND SPHEROIDAL SURFACES.

Application filed October 6, 1922. Serial No. 592,716.

*To all whom it may concern:*

Be it known that I, JESSE D. LYON, a citizen of the United States of America, and resident of Cincinnati, in the county of Hamilton and State of Ohio, have invented a new and useful Improvement in a Method and Apparatus for Marking Spherical and Spheroidal Surfaces, of which the following is a specification.

An object of my invention is to provide a device for marking spherical and spheroidal surfaces, of which golf balls may be employed as an example, which is simple and efficient in construction and operation.

Another object of my invention is to provide a device for the purpose stated which is compact and requires a minimum of space.

Another object is to provide a marker which will effect a polar marking of such surfaces, or in other words, mark the surface in planes parallel with but not necessarily identical with any diameter of the object having the surface to be marked.

Another object of my invention is to provide a device for the purposes stated, wherein the dies for marking the surfaces under consideration, may be readily interchanged.

These and other objects are attained by means described herein and disclosed in the accompanying drawing, in which:

Fig. 1 is a side elevation of a surface marker embodying my invention, operative on a golf ball.

Fig. 2 is a sectional view on line 2—2 of Fig. 1.

Fig. 3 is a view of a golf ball showing the form of marking produced with devices embodying my invention and I have shown my device in the nature of a golf ball marker, altho its use is not limited to this field.

A circular band or frame 3 has a boss 4 formed upon it.

The boss has a threaded bore 5 in which is mounted the threaded hub or nut 6 carrying a flange 7. The hub has an axial bore 8 enlarged at one end and reduced at the other end as shown in Fig. 2, whereby to form a shoulder 9 intermediate the ends of the bore 8. A shaft 10 is revolubly contained in the enlarged portion of the bore 8 and has a reduced shank 11 extending thru the reduced portion of the bore in the nut 6. A shoulder 12 is formed on the shaft 10 and abuts the shoulder 9 on the nut. A hand wheel 13 is mounted upon the shank 11, and serves as a means whereby rotatory motion may be imparted to the shaft 10. The enlarged portion of the shaft 10 terminates between the branches 14 and 15 of the band 3 and has a threaded axial bore 16 in which the screw 17 removably engages. The screw has an enlarged head 18. A flat disc-like die 19 is revolubly mounted upon the screw 17 and has a central aperture 20 thru which the shank 21 of the screw 17 extends. The head of the screw and the bore in the disc bear a relation such that the head of the screw retains the disc upon the shaft 10, yet permits movement of the disc upon the head 18 as a bearing. The shaft 10 has an arm 22 carrying a bearing 23, the bearing being adapted to engage the disc 19. The disc 19 carries on one face suitable marking means whereby to make an impression upon the golf ball 25 disposed within the basket 26 mounted between the branches 14 and 15. Trunnions 27 and 28 provide bearings supporting the basket 26. The basket is so related to the other parts of the device that it centers a ball contained therein. A thumb or screw 29, or other suitable means, is carried by the frame and provides means whereby the basket may be held in a fixed relation to the branches.

The operation of my device is as follows:

When a ball is placed in the basket and the basket is secured by means of screw 29, the point or pole 30 of the ball is held in alignment with the center of the ball and the axis of shaft 10. The trunnions permit tilting of the basket 26 upon its bearings, whereby the golf ball 25 may be deposited within the basket. The disc 19 is then brought into engagement with the golf ball by means of the nut 6. This is effected by screwing the nut 6 into the boss 4 to such extent that the bearing 23 will engage the upper face of the disc 19 and will cause the marking or die plate 24 to leave its impression upon the golf ball. The hand wheel 13 is then revolved, thereby rotating the shaft 10. As the shaft 10 rotates the disc 19 is tilted about the head 18 of the screw 17 and the golf ball has impressed upon it the entire legend carried by the disc 19, the various devices carried by the die being successively brought into operation upon the ball surface. After the shaft 10 has been revolved, the hub of the wheel 7 may be moved further thru the boss 4 and the hand wheel again be revolved, thereby making a deeper impression.

What I claim is:

1. In a device of the class described the combination of a frame adapted to accomodate a ball, the frame being provided with a threaded bore having its axis extending in alignment with the diameter of a ball supported by the frame, a nut having a threaded hub engaging in the threaded bore in the frame and having an axial bore reduced at one end whereby a seat is formed on the nut intermediate the ends of the bore, a shaft revolubly mounted in the bore in the nut, having a shoulder engaging the shoulder on the nut, a screw carried by the shaft having a globular head, a disc form die tiltably mounted upon the head of the screw, an arm mounted on the shaft, and a bearing carried by the arm adapted to engage the disc and to press the disc into engagement with a ball carried by the frame.

2. In a device of the class described the combination of a frame adapted to accomodate a ball, and having a threaded bore, a nut engaging in the threaded bore and having an axial bore, the nut being provided with a shoulder intermediate the ends of the bore, a shaft revolubly mounted in the bore in the nut and provided with a shoulder adapted to engage the shoulder on the nut and extending thru the bore in the nut, a disc-like die tiltably mounted upon one end of the shaft, means carried by the shaft adapted to tilt the die and to bring the die into engagement with a bore carried by the frame, and means to revolve the shaft, the shaft and the die being tiltable and revoluble on axes extending in alignment with a diameter of a ball carried by the frame.

3. In a device of the class described the combination of a frame, a basket carried by the frame adapted to accommodate a ball, a nut adjustable toward and away from the basket and a revoluble shaft carried by the nut and provided with means for making an impression upon the ball.

4. In a device of the class described the combination of a frame adapted to accomodate a ball, a revoluble shaft provided with means for making an impression upon a ball, and means for adjusting the revoluble shaft toward and away from a ball carried by the frame.

5. In a device of the class described the combination of a frame adapted to accomodate a ball, a nut adjustable upon the frame toward and away from a ball carried by the frame, a revoluble shaft mounted on the nut, a die tiltably mounted upon the shaft, and means carried by the shaft adapted to tilt the die and to press the die upon the ball whereby to make an impression upon the ball.

6. In a device of the class described the combination of a frame adapted to accommodate a ball, a revoluble shaft, means to adjust the shaft toward and away from a ball carried by the frame, and to lock the shaft against longitudinal movement, a circular disc having die members upon one of its side faces tiltably and revolubly mounted upon the shaft, and means carried by the shaft for engaging the second side face of the disc and bringing the die elements into engagement with a ball, capable of tilting the disc upon the shaft as the shaft is revolved.

7. In a device of the class described the combination of means to support a ball or the like, a die having a flat surface carrying a circular marking to be applied to the ball, and means to bring adjacent portions of the circular marking into successive marking engagement upon the ball.

8. In a device of the class described the combination of means to support a ball or the like, a flat disk-like die having opposed flat faces, one of which faces carries a circular marking to be applied to the ball, means to position the disk to bring one portion of the marking into engagement upon the ball, and, means for applying pressure successively over the separate portions of the disk.

9. The method of marking spheroid and spheroidal surfaces comprising bringing a portion of a flat faced die having on its flat face characters to be brought into marking engagement upon the surface and rotatably tilting the die in relation to the surface whereby to successively bring a circular portion of the die into marking engagement upon successive portions of a circular area on the surface to be marked.

10. In a device of the class described the combination of a frame for accommodating an object to be marked, and a flat faced tiltable die rotatable about a diameter of the object to be marked, the flat face of the die carrying a legend, successive portions of which legend are brought into contact with the object on applying pressure to successive portions of the disk.

11. In a device of the class described the combination of a frame for receiving a ball, a flat faced disk die carried by the frame, carrying an annular legend on its flat face, and means for bringing successive portions of the legend into contact with the ball.

12. In a device of the class described the combination of a frame for holding a sphere, a bearing carried by the frame, and disk die tiltable on said bearing, the bearing and die being capable of relative rotatory motion about a diameter of a sphere held by the frame, the die having a flat face carrying a legend, and means rotatable in the direction of the possible relative rotation of the bearing and die for tilting the die on said bearing and for bringing successive portions of said legend bearing die face into engagement with the sphere.

In testimony whereof, I have hereunto subscribed my name this 2nd day of October, 1922.

JESSE D. LYON.